(12) United States Patent
Kisin et al.

(10) Patent No.: US 8,779,051 B2
(45) Date of Patent: Jul. 15, 2014

(54) THERMOPLASTIC COMPOSITION, METHOD OF PRODUCING THE SAME, AND ARTICLES MADE THEREFROM

(75) Inventors: Srdjan Kisin, Horgen (CH); Eric G. Lundquist, North Wales, PA (US); Timothy E. Clayfield, Waedenswil (CH); Yannick Saint-Gerard, Roquefort-les-Pins (FR); Veera Nelliappan, North Wales, PA (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/808,951

(22) PCT Filed: Jul. 6, 2011

(86) PCT No.: PCT/US2011/042987
§ 371 (c)(1),
(2), (4) Date: Jan. 8, 2013

(87) PCT Pub. No.: WO2012/006297
PCT Pub. Date: Jan. 12, 2012

(65) Prior Publication Data
US 2013/0116382 A1 May 9, 2013

Related U.S. Application Data

(60) Provisional application No. 61/362,352, filed on Jul. 8, 2010.

(51) Int. Cl.
*C08L 51/00* (2006.01)
*C08L 53/00* (2006.01)
*C08F 290/04* (2006.01)
*C08K 5/00* (2006.01)

(52) U.S. Cl.
USPC .............. 524/504; 524/515; 525/88; 525/902

(58) Field of Classification Search
USPC ............. 525/504, 902, 88; 524/504, 515
See application file for complete search history.

(56) References Cited

U.S. PATENT DOCUMENTS

| 4,306,040 | A | | 12/1981 | Baer | |
|---|---|---|---|---|---|
| 4,495,324 | A | * | 1/1985 | Chacko et al. | ............... 524/504 |
| 4,581,408 | A | | 4/1986 | Trabert et al. | |
| 4,584,344 | A | * | 4/1986 | Baer | ............... 525/66 |
| 5,457,156 | A | | 10/1995 | Liu et al. | |
| 2009/0215927 | A1 | | 8/2009 | Mohite et al. | |

FOREIGN PATENT DOCUMENTS

JP 2010-120983 A 6/2010

OTHER PUBLICATIONS

PCT/ US2011/042987,; International Search Report.
PCT/ US2011/042987, International Preliminary Report on Patentability.
PCT/ US2011/042987,; Written Opinion of the International Searching Authority.

* cited by examiner

*Primary Examiner* — Nathan M Nutter (57) ABSTRACT

The instant invention provides a thermoplastic composition, method of producing the same, and articles made therefrom. The thermoplastic composition according to present invention comprises the melt blending product of: (a) from 10 to 75 percent by weight of a continuous phase, based on the total weight of the thermoplastic composition, wherein said continuous phase comprises one or more thermoplastic polymers; and (b) from 25 to 90 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm.

14 Claims, 3 Drawing Sheets

THERMOPLASTIC COMPOSITION, METHOD OF PRODUCING THE SAME, AND ARTICLES MADE THEREFROM

CROSS-REFERENCE TO RELATED APPLICATIONS

This application is a non-provisional application claiming priority from the U.S. Provisional Patent Application No. 61/362,352 filed on Jul. 8, 2010 entitled "THERMOPLASTIC COMPOSITION, METHOD OF PRODUCING THE SAME, AND ARTICLES MADE THEREFROM," the teachings of which are incorporated by reference herein, as if reproduced in full hereinbelow.

FIELD OF INVENTION

The instant invention relates to a thermoplastic composition, method of producing the same, and articles made therefrom.

BACKGROUND OF THE INVENTION

Thermoplastic vulcanicates (TPV) are elastomer/thermoplastic polymer blends in which elastomer phase is crosslinked during the blending process and dispersed in a thermoplastic matrix. Typical TPVs are made from crosslinked EPDM dispersed in a matrix of polypropylene.

Key properties of TPVs include (1) resistance to plastic deformation (that is, low compression and tensile set), (2) resistance to fluids, (3) retention of properties at elevated temperature relative to those at ambient temperature, and (4) low creep and stress relaxation.

TPVs are prepared by a process of dynamic vulcanization, defined as "the process of intimate melt mixing of a rubbery polymer, a curative, and a thermoplastic polymer to vulcanize (or cross-link) the rubbery polymer. Upon melt mixing of the thermoplastic and rubbery polymer under high shear, the rubbery polymer tends to become the continuous phase, and as the rubbery polymer is vulcanized, a phase inversion occurs, wherein the thermoplastic material will tend to become the continuous phase with the crosslinked rubbery material dispersed in it. Various curing agents, generally known to those skilled in the art, may be employed to crosslink the rubbery component of TPVs.

The most common polymer system in TPVs is PP/EPDM rubber; however, a number of other polymer systems have been used commercially. These include PP/NBR, PP/butyl and PP/halobutyl, PP/NR, and PP/EVA/EPDM.

The morphology of a TPV is best understood as a dispersion of small and highly cross-linked elastomer particles in a continuous phase of hard thermoplastic. The size of the elastomer phase particles is one key to the performance of the TPVs. As the size of these particles decreases, the ultimate tensile properties of the TPVs increase. The second key to TPV performance is the cross-linking of the soft elastomer phase. Cross-linked elastomeric phase provides acceptable properties, which allows the TPV to capture many of the applications previously devoted to thermoset rubbers.

TPVs have various mechanical properties such as modulus (compression or tensile), tear strength, abrasion resistance and compression set resistance, which make them suited for a broad range of rubber applications.

Despite the improved properties of currently available TPVs, the dynamic vulcanization process producing such TPVs is expensive and complex because the process steps of mixing and vulcanization compete with each other and are difficult to control. Therefore, there is a need for non-vulcanized thermoplastic compositions having acceptable mechanical properties such as modulus (compression or tensile), tear strength, abrasion resistance and compression set resistance, which make such thermoplastic compositions suited for broad range of rubber applications.

SUMMARY OF THE INVENTION

The instant invention provides a thermoplastic composition, method of producing the same, and articles made therefrom.

In one embodiment, the instant invention provides a thermoplastic composition comprising the melt blending product of: (a) from 10 to 75 percent by weight of a continuous phase, based on the total weight of the thermoplastic composition, wherein said continuous phase comprises one or more thermoplastic polymers; and (b) from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm.

In an alternative embodiment, the instant invention further provides a method for producing a thermoplastic composition comprising the steps of: (1) selecting a continuous phase comprising one or more thermoplastic polymers; (2) selecting a dispersed phase comprising one or more core/shell polymer particles comprising a crosslinked elastomer core and a thermoplastic shell and wherein said core/shell polymer has an average particle size diameter in the range of from 70 to 10,000 nm; (3) melt kneading said one or more core/shell polymer particles into said continuous phase; (4) thereby producing said thermoplastic composition, wherein said thermoplastic composition comprises from 10 to 75 percent by weight of the continuous phase, and from 90 to 25 percent by weight of the dispersed phase comprising one or more core/shell polymer particles, based on the total weight of the thermoplastic composition.

In another alternative embodiment, the instant invention further provides an article comprising a thermoplastic composition comprising the melt blending product of: (a) from 10 to 75 percent by weight of a continuous phase, based on the total weight of the thermoplastic composition, wherein said continuous phase comprises one or more thermoplastic polymers; and (b) from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm.

In another alternative embodiment, the instant invention further provides method for forming an article comprising the steps of: (1) selecting a thermoplastic composition comprising the melt blending product of from 10 to 75 percent by weight of a continuous phase, based on the total weight of the thermoplastic composition, wherein said continuous phase comprises one or more thermoplastic polymers; and from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm; and (2) forming said thermoplastic composition into said article.

In one embodiment, the instant invention provides a thermoplastic composition consisting essentially of the melt blending product of: (a) from 10 to 75 percent by weight of a continuous phase, based on the total weight of the thermoplastic composition, wherein said continuous phase comprises one or more thermoplastic polymers; and (b) from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm.

In an alternative embodiment, the instant invention further provides a method for producing a thermoplastic composition consisting essentially of the steps of: (1) selecting a continuous phase comprising one or more thermoplastic polymers; (2) selecting a dispersed phase comprising one or more core/shell polymer particles comprising a crosslinked elastomer core and a thermoplastic shell and wherein said core/shell polymer has an average particle size diameter in the range of from 70 to 10,000 nm; (3) melt kneading said one or more core/shell polymer particles into said continuous phase; (4) thereby producing said thermoplastic composition, wherein said thermoplastic composition comprises from 10 to 75 percent by weight of the continuous phase, and from 90 to 25 percent by weight of the dispersed phase comprising one or more core/shell polymer particles, based on the total weight of the thermoplastic composition.

In another alternative embodiment, the instant invention further provides an article consisting essentially of a thermoplastic composition consisting essentially of the melt blending product of: (a) from 10 to 75 percent by weight of a continuous phase, based on the total weight of the thermoplastic composition, wherein said continuous phase comprises one or more thermoplastic polymers; and (b) from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm.

In another alternative embodiment, the instant invention further provides method for forming an article consisting essentially of the steps of: (1) selecting a thermoplastic composition consisting essentially of the melt blending product of from 10 to 75 percent by weight of a continuous phase, based on the total weight of the thermoplastic composition, wherein said continuous phase comprises one or more thermoplastic polymers; and from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm; and (2) forming said thermoplastic composition into said article.

In an alternative embodiment, the instant invention provides a thermoplastic composition, method of producing the same, articles made therefrom, and method of making such articles, in accordance with any of the preceding embodiments, except that the one or more thermoplastic polymers are selected from the group consisting of acrylonitrile butadiene styrene polymer (ABS), fluoropolymers, polyamides, polyarylates, thermoplastic polyesters (PET, PBT), thermoplastic polyimides (PI, PAI, PEI), polyoxymethylene (POM), polyacetal, polyphenylene oxide (PPO), polyaryletherketones (PEEK, PEK), polysulphones (PSUL, PES), polyphenylene sulphide (PPS), polyethylene, polypropylene, polyphenylene sulfide, polystyrene, polyvinyl chloride, polycarbonate, polylactic acid, polyether sulfide, and polymethacrylate.

In an alternative embodiment, the instant invention provides a thermoplastic composition, method of producing the same, articles made therefrom, and method of making such articles, in accordance with any of the preceding embodiments, except that the one or more thermoplastic polymers have a melting point of greater than 85° C. (measured via DSC, first heat) or a glass transition temperature of greater than 85° C. (measured via DSC, first heat).

In an alternative embodiment, the instant invention provides a thermoplastic composition, method of producing the same, articles made therefrom, and method of making such articles, in accordance with any of the preceding embodiments, except that the one or more thermoplastic polymers have a melting point of greater than 100° C. (measured via DSC, first heat) or a glass transition temperature of greater than 100° C. (measured via DSC, first heat).

In an alternative embodiment, the instant invention provides a thermoplastic composition, method of producing the same, articles made therefrom, and method of making such articles, in accordance with any of the preceding embodiments, except that the one or more thermoplastic polymers have a melting point of greater than 150° C. (measured via DSC, first heat) or a glass transition temperature of greater than 150° C. (measured via DSC, first heat).

In an alternative embodiment, the instant invention provides a thermoplastic composition, method of producing the same, articles made therefrom, and method of making such articles, in accordance with any of the preceding embodiments, except that the one or more core/shell polymer particles comprise a crosslinked elastomer core and a thermoplastic shell. In an alternative embodiment, the instant invention provides a thermoplastic composition, method of producing the same, articles made therefrom, and method of making such articles, in accordance with any of the preceding embodiments, except that the core comprises a crosslinked elastomeric component having a glass transition temperature in the range of from less than 0° C., for example, from less than −50° C.; or in the alternative, from less than −80° C.

In an alternative embodiment, the instant invention provides a thermoplastic composition, method of producing the same, articles made therefrom, and method of making such articles, in accordance with any of the preceding embodiments, except that the shell comprises a thermoplastic component having a glass transition temperature in the range of greater than from 30° C.

In an alternative embodiment, the instant invention provides a thermoplastic composition, method of producing the same, articles made therefrom, and method of making such articles, in accordance with any of the preceding embodiments, except that the one or more core/shell polymer particles comprise a core comprising crosslinked polyalkyl (meth)acrylate copolymers, polybutadiene copolymers, or polydimethylsiloxane copolymers and one or more shells comprising alkyl(meth)acrylates copolymers and/or crosslinked derivatives thereof. Alkyl (meth)acrylic monomers are (meth)acrylic acid, substituted or unsubstituted esters of (meth)acrylic acid, As used herein "(meth)acrylic" means acrylic or methacrylic; "(meth)acrylate" means acrylate or methacrylate. A crosslinked copolymer comprises one or more crosslinking monomers. A crosslinking monomer is a monomer that has two or more reactive groups that are capable of participating in a polymerization reaction In an alternative embodiment, the instant invention provides a thermoplastic composition, method of producing the same, articles made therefrom, and method of making such articles, in accordance with any of the preceding embodiments, except that the crosslinked polyalkyl(meth)acrylate copolymer core comprise one or more monomers selected from the group consisting of butyl acrylate, ethyl acrylate, 2-ethyl hexyl acrylate, propyl acrylate, methyl acrylate, hexyl acrylate, butylmethacrylate, methylmethacrylate, ethylhexyl methacrylate, benzyl acrylate, and crosslinking monomers selected from the group consisting of divinylbenzene, trimethyolpropane triacrylate, ethylene glycol dimethacrylate, trimethyolpropane trimethacrylate, allyl methacrylate, blends thereof, and combinations thereof.

In an alternative embodiment, the instant invention provides a thermoplastic composition, method of producing the same, articles made therefrom, and method of making such articles, in accordance with any of the preceding embodiments, except that the crosslinked polybutadiene copolymer core comprises one or more monomers selected from the group consisting of butadiene, styrene, butyl acrylate, ethyl acrylate, 2-ethyl hexyl acrylate, propyl acrylate, methyl acrylate, hexyl acrylate, butylmethacrylate, ethylhexyl methacrylate, methylmethacrylate, benzyl acrylate, and crosslinking monomers selected from the group consisting of divinylbenzene, trimethyolpropane triacrylate, ethylene glycol dimethacrylate, trimethyolpropane trimethacrylate, allyl methacrylate, blends thereof, and combinations thereof.

In an alternative embodiment, the instant invention provides a thermoplastic composition, method of producing the same, articles made therefrom, and method of making such articles, in accordance with any of the preceding embodiments, except that the crosslinked polydimethylsiloxane copolymer core comprises one or more monomers selected from the group consisting of vinylmethyldimethoxysilane, allylmethyldimethoxysilane, mercaptopropylmethyldimethoxysilane, butadiene, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, and crosslinking monomers selected from the group consisting of divinylbenzene, trimethyolpropane triacrylate, ethylene glycol dimethacrylate, trimethyolpropane trimethacrylate, allyl methacrylate, blends thereof, and combinations thereof.

In an alternative embodiment, the instant invention provides a thermoplastic composition, method of producing the same, articles made therefrom, and method of making such articles, in accordance with any of the preceding embodiments, except that the thermoplastic polymer shell comprises one or more monomers selected from the group consisting of methylmethacrylate, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, benzyl methacrylate, and optionally crosslinking monomers selected from the group consisting of divinylbenzene, trimethyolpropane triacrylate, ethylene glycol dimethacrylate, trimethyolpropane trimethacrylate, allyl methacrylate, blends thereof, and combinations thereof.

In an alternative embodiment, the instant invention provides a thermoplastic composition, method of producing the same, articles made therefrom, and method of making such articles, in accordance with any of the preceding embodiments, except that the thermoplastic polymer shell comprises one or more functional groups In an alternative embodiment, the instant invention provides a thermoplastic composition, method of producing the same, articles made therefrom, and method of making such articles, in accordance with any of the preceding embodiments, except that the functional group is selected from the group consisting of hydroxy group, carboxyl group, epoxy group, glycidol group, anhydride group, amide group, silyl group, allyl group, and combinations of two or more thereof.

In an alternative embodiment, the instant invention provides a thermoplastic composition, method of producing the same, articles made therefrom, and method of making such articles, in accordance with any of the preceding embodiments, except that the functional group is a hydroxy, carboxyl, epoxy, glycidol, anhydride, amide, silyl, or allyl group.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
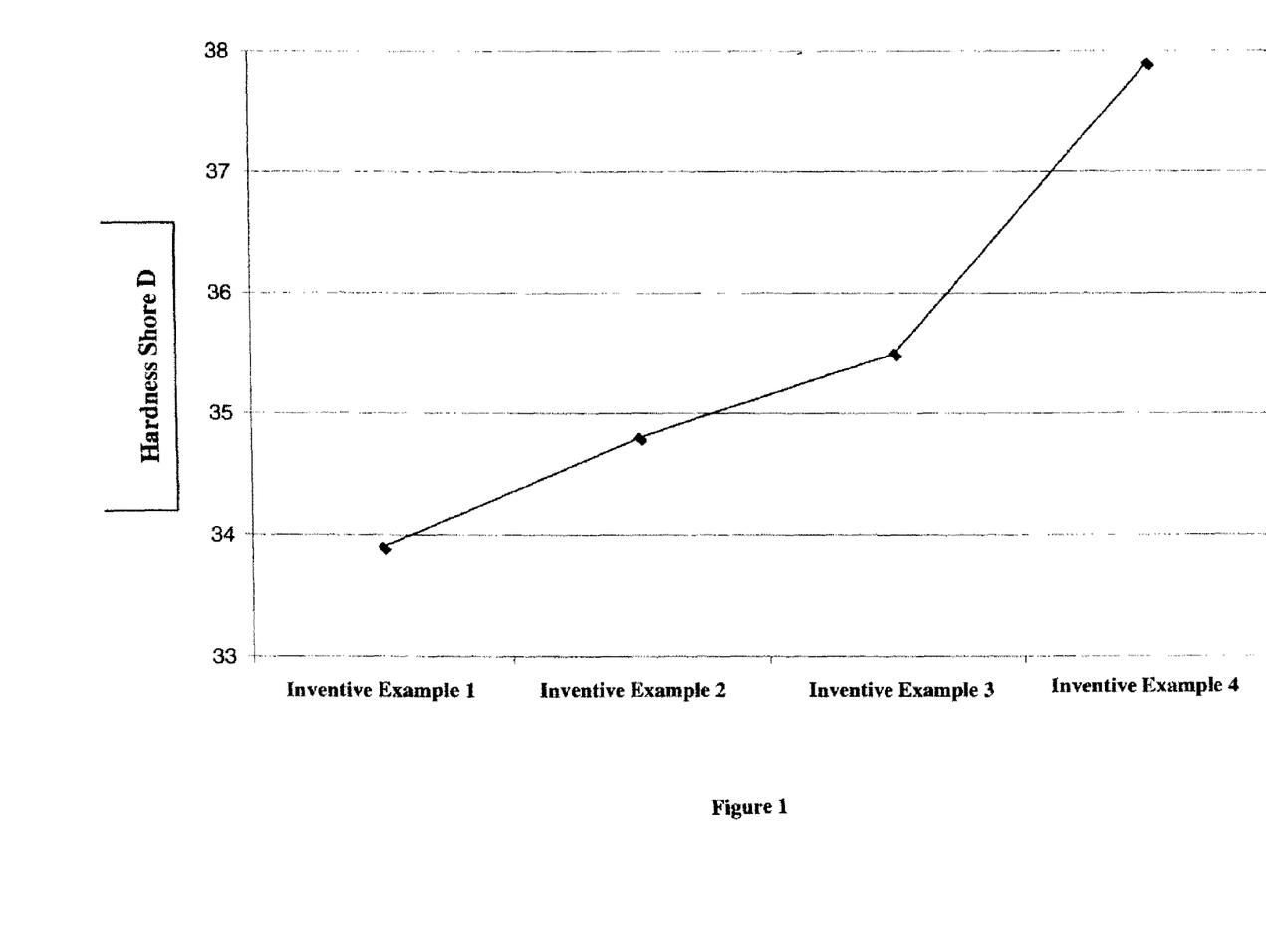
FIG. 1 is a graph showing the Hardness Shore D of Inventive Examples 1-4.
Figure 2:
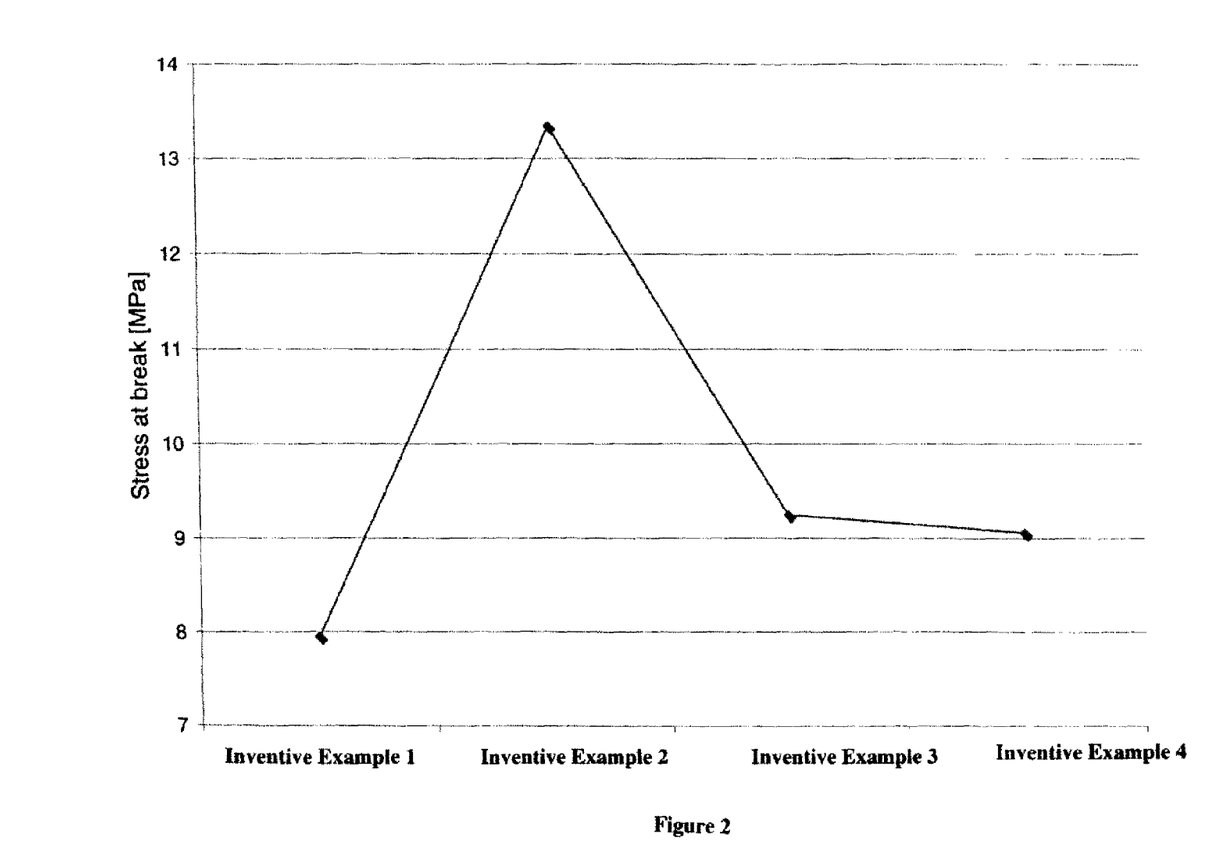
FIG. 2 is a graph showing the Tensile Stress at Break of Inventive Examples 1-4.
Figure 3:
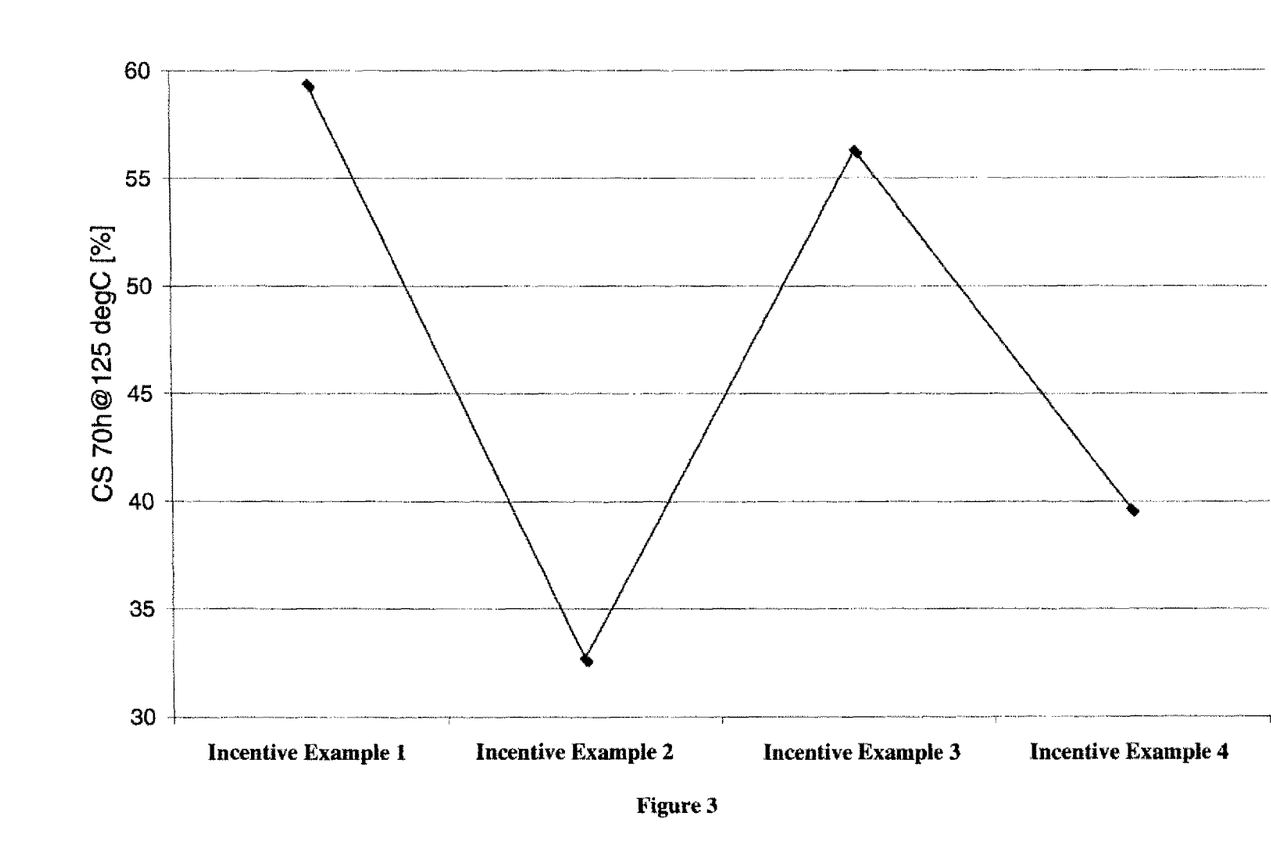
FIG. 3 is a graph showing the Tensile Elongation at Break of Inventive Examples 1-4.

The instant invention provides a thermoplastic composition, method of producing the same, and articles made therefrom.

The thermoplastic composition according to the present invention comprises the melt blending product of: (a) from 10 to 75 percent by weight of a continuous phase, based on the total weight of the thermoplastic composition, wherein said continuous phase comprises one or more thermoplastic polymers; and (b) from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm.

The thermoplastic composition according to the present invention comprises from 10 to 75 percent by weight of a continuous phase, based on the total weight of the thermoplastic composition. All individual values and subranges from 10 to 75 percent are included herein and disclosed herein; for example, the weight percent of the continuous phase can be from a lower limit of 10, 20, 30, 40, or 50 weight percent to an upper limit of 30, 40, 50, 60, 70, or 75 weight percent, based on the total weight of the thermoplastic composition. For example, the weight percent of the continuous phase may be in the range of from 20 to 75 weight percent, or in the alternative, from 20 to 60 weight percent, or in the alternative, from 20 to 50 weight percent, based on the total weight of the thermoplastic composition. The continuous phase comprises one or more thermoplastic polymers. Exemplary thermoplastic polymers include, but are not limited to, acrylonitrile butadiene styrene polymer (ABS), fluoropolymers, polyamides, polyarylates, thermoplastic polyesters (PET, PBT), thermoplastic polyimides (PI, PAI, PEI), polyoxymethylene (POM), polyacetal, polyphenylene oxide (PPO), polyaryletherketones (PEEK, PEK), polysulphones (PSUL, PES), polyphenylene sulphide (PPS), polyethylene, polypropylene, polyphenylene sulfide, polystyrene, polyvinyl chloride, polycarbonate, polylactic acid, polyether sulfide, and polymethacrylate. Such one or more thermoplastic polymers have a melting point temperature of greater than 85° C., measured via DSC, first heat. All individual values and subranges from greater than 85° C. are included herein and disclosed herein; for example, the melting point temperature can be from a lower limit of 85, 90, 100, 110, 120, 130, 140, 150, or 160° C. to an upper limit of 150, 160, 170, 180, 200, or 220° C. For example, the melting point temperature may be in the range of from greater than 100° C., or in the alternative, the melting point temperature may be in the range of from greater than 150° C. Alternatively, such one or more thermoplastic polymers have a glass transition temperature of greater than 85° C., measured via DSC, first heat. All individual values and subranges from greater than 85° C. are included herein and disclosed herein; for example, the glass transition temperature can be from a lower limit of 85, 90, 100, 110, 120, 130, 140, 150, or 160° C. to an upper limit of 150, 160, 170, 180, 200, or 220° C. For example, the glass transition temperature may be in the range of from greater than 100° C., or in the alternative, the glass transition temperature may be in the range of from greater than 150° C.

The thermoplastic composition comprises from 90 to 25 percent by weight of dispersed phase comprising one or more core/shell polymer particles, based on the total weight of the thermoplastic composition. All individual values and subranges from 90 to 25 percent are included herein and disclosed herein; for example, the weight percent of the dispersed phase can be from an upper limit of 30, 40, 50, 60, 70, 80, or 90 weight percent to a lower limit of 25, 30, 40, or 50 weight percent, based on the total weight of the thermoplastic composition. For example, the weight percent of the dispersed phase may be in the range of from 90 to 25 weight percent, or in the alternative, from 80 to 25 weight percent, or in the alternative, from 80 to 50 weight percent, based on the total weight of the thermoplastic composition. The one or more core/shell polymer particles comprise a crosslinked elastomer core and a thermoplastic shell. Such core/shell polymer particles have an average particle size diameter in the range of from 70 to 10,000 nm. All individual values and subranges from 70 to 10,000 nm are included herein and disclosed herein; for example, the average particle size diameter can be from a lower limit of 70, 100, 150, 200, 250 or 300 nm to an upper limit of 200, 250, 300, 350, 400, 500, 600, 750, 1,000, 5,000, 7,500 or 10,000 nm. For example, the average particle size diameter may be in the range of from 70 to 10,000 nm, or in the alternative, from 70 to 5000 nm, or in the alternative, from 70 to 2500 nm, or in the alternative, from 70 to 1000 nm, or in the alternative, from 70 to 750 nm, or in the alternative, from 70 to 600 nm, or in the alternative, from 70 to 550 nm, or in the alternative, from 70 to 400 nm, or in the alternative, from 100 to 400 nm, or in the alternative, from 150 to 400 nm, or in the alternative, from 70 to 300 nm, or in the alternative, from 100 to 300 nm, or in the alternative, from 150 to 300 nm. Average particle size diameter can be measured via standard dynamic light scattering techniques employing, for example, BI-90 light scattering particle size analyzer.

The core/shell polymer particles comprise a crosslinked elastomer core and a thermoplastic shell. The core/shell polymer particles may be produced via emulsion polymerization process, which produces a crosslinked elastomer core and a thermoplastic shell.

The core comprises an elastomeric crosslinked component having a glass transition temperature in the range of from less than 0° C.; for example, less than −50° C., or in the alternative, less than −80° C. The core comprises one or more crosslinked polyalkyl(meth)acrylate copolymers, polybutadiene copolymers, or polydimethylsiloxane copolymers. Alkyl (meth)acrylic monomers are (meth)acrylic acid, substituted or unsubstituted esters of (meth)acrylic acid, As used herein "(meth)acrylate" means acrylate or methacrylate. A crosslinked copolymer also comprises one or more crosslinking monomers. A crosslinking monomer is a monomer that has two or more reactive groups that are capable of participating in a polymerization reaction. Exemplary crosslinked polyalkyl(meth)acrylate copolymer cores comprise one or more monomers selected from the group consisting of butyl acrylate, ethyl acrylate, 2-ethyl hexyl acrylate, propyl acrylate, methyl acrylate, hexyl acrylate, butylmethacrylate, methylmethacrylate, ethylhexyl methacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof. In the alternative, exemplary crosslinked polybutadiene copolymer cores comprise one or more monomers selected from the group consisting of butadiene, styrene, butyl acrylate, ethyl acrylate, 2-ethyl hexyl acrylate, propyl acrylate, methyl acrylate, hexyl acrylate, butylmethacrylate, ethylhexyl methacrylate, methylmethacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof. In the alternative, the crosslinked polydimethylsiloxane copolymer cores comprise one or more monomers selected from the group consisting of vinylmethyldimethoxysilane, allylmethyldimethoxysilane, mercaptopropylmethyldimethoxysilane, butadiene, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof. Additional exemplary crosslinkers include, but are not limited to, divinylbenzene, allyl methacrylate, butanediol dimethacrylate, and trimethylol propane trimethacrylate.

The shell comprises a polymeric component having a glass transition temperature in the range of greater than from 30° C. The shell comprises a thermoplastic polymer. For example, the thermoplastic polymer shell comprises one or more monomers selected from the group consisting of methylmethacrylate, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, benzyl methacrylate, and optionally one or more crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof. For example, the one or more shells comprise alkyl(meth)acrylates copolymers and/or crosslinked derivatives thereof. Exemplary polyalkyl(meth)acrylate copolymer shells comprise one or more monomers selected from the group consisting of butyl acrylate, ethyl acrylate, 2-ethyl hexyl acrylate, propyl acrylate, methyl acrylate, hexyl acrylate, butylmethacrylate, methylmethacrylate, ethylhexyl methacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof. Exemplary crosslinkers include, but are not limited to, divinylbenzene, allyl methacrylate, butanediol dimethacrylate, and trimethylol propane trimethacrylate. The shell may further comprise one or more functional groups. Such functional groups may, for example, be di-functional group or multi-functional group. Such functional groups include, but are not limited to, one or more hydroxy groups, one or more carboxyl groups, one or more epoxy groups, one or more glycidol groups, one or more anhydride groups, one or more amide groups, one or more silyl groups, one or more allyl groups and combinations thereof. Such crosslinked elastomer core/shell particles are commercially available under the trade name PARALOID™, available form The Dow Chemical Company.

The thermoplastic compositions according to the present invention are readily available to be formed into an article without any additional polymer components. The thermoplastic compositions according to the present invention are substantially free from any additional polymers. The term "substantially free of," as used herein, refers to less than 5 percent by weight of any additional polymers, based on the total weight of the thermoplastic composition; for example, less than 4 weight percent; or in the alternative, less than 3 weight percent; or in the alternative, less than 2 weight percent; or in the alternative, less than 1 weight percent. Accordingly, the thermoplastic compositions according to the present invention are not masterbatches, which require additional polymers, i.e. for example greater than 5 weight percent; or in the alternative, greater than 10 weight percent; or in the alternative, greater than 15 weight percent; or in the alternative, greater than 20 weight percent; or in the alternative, greater than 30 weight percent; based on the total weight of the thermoplastic compositions. The thermoplastic compositions of the present invention may further includes additional additives including, but are not limited to, antistatic agents, color enhancers, dyes, lubricants, fillers, flame retardants, pigments, primary antioxidants, secondary antioxidants, processing aids, UV stabilizers, plasticizers, blends thereof, and combinations thereof. The inventive thermoplastic compositions may contain any amounts of additives. The inventive thermoplastic compositions may compromise from about 0 to about 10 percent by the combined weight of such additives, based on the weight of the inventive thermoplastic composition including such additives. All individual values and subranges from about 0 to about 10 weight percent are included herein and disclosed herein; for example, the inventive thermoplastic compositions may compromise from 0 to 7 percent by the combined weight of additives; or in the alternative, from 0 to 5 weight percent; or in the alternative, from 0 to 3 weight percent; or in the alternative, from 0 to 2 weight percent; or in the alternative, from 0 to 1 weight percent; or in the alternative, from 0 to 0.5 weight percent. Exemplary antioxidants include, for example, Irganox™ 1010. Irganox™ 1010 is tetrakis (methylene (3,5-di-tert-butyl-4-hydroxyhydrocinnamate) available from Ciba Geigy Inc.

In the process for producing the thermoplastic composition, one or more continuous phase comprising one or more thermoplastic polymers, as described hereinabove, and a dispersed phase comprising one or more core/shell polymer particles comprising a crosslinked elastomer core and a thermoplastic shell, as described hereinabove, are melt kneaded, for example, via a Haake mixer, a Banbury mixer, or an extruder, e.g. twin screw extruder. The core/shell polymer particles are physically dispersed in the continuous phase. It is important to uniformly disperse the core/shell polymer particles into the continuous phase.

In one embodiment, the method for producing the thermoplastic composition according to the present invention comprises the steps of: (1) selecting a continuous phase comprising one or more thermoplastic polymers; (2) selecting a dispersed phase comprising one or more core/shell polymer particles comprising a crosslinked elastomer core and a thermoplastic shell and wherein said one or more core/shell polymers have an average particle size diameter in the range of from 70 to 10,000 nm; (3) melt kneading said one or more core/shell polymer particles into said continuous phase; (4) thereby producing said thermoplastic composition, wherein said thermoplastic composition comprises from 10 to 75 percent by weight of the continuous phase, and from 90 to 25 percent by weight of the dispersed phase comprising one or more core/shell polymer particles, based on the total weight of the thermoplastic composition.

In one embodiment, the article according to the present invention comprises a thermoplastic composition comprising the melt blending product of: (a) from 10 to 75 percent by weight of a continuous phase, based on the total weight of the thermoplastic composition, wherein said continuous phase comprises one or more thermoplastic polymers; and (b) from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm.

In another alternative embodiment, the method for forming an article according to the present invention comprises the steps of: (1) selecting a thermoplastic composition comprising the melt blending product of from 10 to 75 percent by weight of a continuous phase, based on the total weight of the thermoplastic composition, wherein said continuous phase comprises one or more thermoplastic polymers; and from 90 to 25 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm; and (2) forming said thermoplastic composition into said article.

The thermoplastic compositions disclosed herein can be used to manufacture durable articles for the automotive, construction, medical, food and beverage, electrical, appliance, business machine, and consumer markets. In some embodiments, the thermoplastic compositions are used to manufacture flexible durable parts or articles selected from toys, grips, soft touch handles, bumper rub strips, floorings, auto floor mats, wheels, casters, furniture and appliance feet, tags, seals, gaskets such as static and dynamic gaskets, automotive doors, interior trims, bumper fascia, grill components, rocker panels, hoses, linings, office supplies, seals, liners, diaphragms, tubes, lids, stoppers, plunger tips, delivery systems, kitchen wares, shoes, shoe bladders and shoe soles. In other embodiments, the thermoplastic compositions can be used to manufacture durable parts or articles that require a resistance to non-polar fluids. In further embodiments, the thermoplastic compositions can be used to manufacture durable parts or articles that require a high upper service temperature and low modulus. The thermoplastic compositions of the present invention may be formed into automotive articles such as air ducts, cables, hoses, brake hose covers, and the like. Additionally the thermoplastic compositions of the present invention may also be formed into consumer and sporting-goods.

The thermoplastic compositions can be used to prepare these durable parts or articles with known polymer processes such as extrusion (e.g., sheet extrusion and profile extrusion); molding (e.g., injection molding, rotational molding, and blow molding); fiber spinning; and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum.

Molding is generally a process by which a polymer is melted and led into a mold, which is the inverse of the desired shape, to form parts of the desired shape and size. Molding can be pressureless or pressure-assisted.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene.

EXAMPLES

The following examples illustrate the present invention but are not intended to limit the scope of the invention.
Formulation Components PA12 is a low viscosity polyamide, i.e. poly[imino(1-oxo-1,12-dodecanediyl)], under the tradename Grilamid L 16 Natural, provided by EMS-GRIVORY, which is a non-reinforced polyamide, UV- and heat-stabilized, having a density, measured according to ISO 1183, of approximately 1.01 g·cm$^3$, and a DSC melting point temperature of approximately 178° C.

PA6 is a low viscosity general-purpose, polyamide 6, under the tradename ULTRAMID™, provided by BASF, having a density, measured according to ISO 1183, of approximately 1.13 g/cm$^3$.

PC is a low viscosity multi purpose poly carbonate, bisphenol A polycarbonate, having a density, measured according to ISO 1183, of approximately 1.2 g·cm$^3$, under the tradename LEXAN 121, provided by SABIC.

PARALOID™ KM 370 comprises emulsion polymerized acrylic core shell particles, having cross-linked polybutyl acrylate rubber core with glass transition temperature of approximately −45° C., and poly (methyl methacrylate) shell with glass transition temperature of approximately 110° C., and a weight ratio of core to shell up to approximately 90 weight percent to 10 weight percent, respectively, and an average particle size diameter of approximately 250 nm, from The Dow Chemical Company.

PARALOID™ KM 357 comprises emulsion polymerized acrylic core shell particles, having a crosslinked polybutyl acrylate/poly 2-ethyl hexyl acrylate rubber core with a glass transition temperature of approximately −64° C. and poly (methyl methacrylate)/polybutyl acrylate shell with a glass transition temperature of approximately 75° C., and a weight ratio of core to shell up to approximately 92 weight percent to 8 weight percent, respectively, and an average particle size diameter of approximately 350 nm, from The Dow Chemical Company.

PARALOID™ EXL 2314 comprises emulsion polymerized acrylic core shell particles, having cross-linked polybutyl acrylate rubber core with glass transition temperature of approximately −45° C., and poly (methyl methacrylate) shell with glass transition temperature of approximately 110° C., and a weight ratio of core to shell up to approximately 80 weight percent to 20 weight percent, respectively, and an average particle size diameter of approximately 550 nm, from The Dow Chemical Company. The shell further comprises 1 percent by weight of glycidyl methacrylate to give a functional shell composition.

LTL 4450 comprises emulsion polymerized acrylic core shell particles having a crosslinked polybutyl acrylate core (89 percent by weight) with a glass transition of approximately −45° C. and a shell comprising a copolymer of polymethyl methacrylate (9 percent by weight) and polymethacrylic acid (1 percent by weight), with a weight ratio of core to shell of approximately 90 weight percent to 10 weight percent, respectively, and an average particle size diameter of approximately 260 nm.
Formulation Process Inventive Examples 1-2 were prepared via roll-mill equipment based on the following formulation proportions: (1) 19.98 percent by weight of continues phase, as shown in Table 1; (2) 79.92 percent by weight of dispersed particles, as shown in Table 1; and (3) 0.10 percent by weight of an antioxidant, i.e. IRGANOX 1010. The formulation components were uniformly mixed at the front roll temperature of approximately 200° C. and rear roll temperature of approximately 190° C.

Inventive Examples 3-4 were prepared via a Haake compounding device based on the following formulation proportions: (1) 19.98 percent by weight of continues phase, as shown in Table 1; (2) 79.92 percent by weight of dispersed particles, as shown in Table 1; and (3) 0.10 percent by weight of an antioxidant, i.e. IRGANOX 1010. The formulation components were prepared according to the processing conditions shown in Table 2.

Inventive Examples 5-9 were prepared via a twin screw extruder based on the following formulation proportions: (1) 19.98 percent by weight of continues phase, as shown in Table 1; (2) 79.92 percent by weight of dispersed particles, as shown in Table 1; and (3) 0.10 percent by weight of an antioxidant, i.e. IRGANOX 1010. The formulation components were prepared according to the processing conditions shown in Table 3.

Inventive Examples 1-4 were formed into 2 mm thick plaques by compression molding at 200° C. for 4 minutes at 10 bar followed by 4 minutes at 200 bar. The plaques were tested for hardness, tensile properties and compression set properties.

Inventive examples 5-9 were formed into 3 mm thick plaques and dumbbell specimens by injection molding. Injection molding was done using the temperature profile of the extruder of 220° C.-218° C.-216° C.-205° C. (die←feeder) and the mold temperature of 50° C.

Hardness measurements were made with the Shore D durometer tester at room temperature with a dwell time of 3 s, according to ISO 868 standard.

The present invention may be embodied in other forms without departing from the spirit and the essential attributes thereof, and, accordingly, reference should be made to the appended claims, rather than to the foregoing specification, as indicating the scope of the invention.

TABLE 1

| Example Number | Dispersant | Continuous Phase | Compounding Equipment | Hardness [Shore D] | Stress at break [MPa] | Compression Set 70 h@125 C. [%] |
|---|---|---|---|---|---|---|
| Inventive Example 1 | PARALOID ™ KM 370 | PA12 | Roll-mill | 34 | 7.95 | 59.4 |
| Inventive Example 2 | PARALOID ™ EXL 2314 | PA12 | Roll-mill | 35 | 13.34 | 32.7 |
| Inventive Examples 3 | PARALOID ™ KM 370 | PA12 | Haake | 36 | 9.25 | 56.3 |
| Inventive Example 4 | PARALOID ™ EXL 2314 | PA12 | Haake | 38 | 9.06 | 39.7 |
| Inventive Example 5 | PARALOID ™ EXL 2314 | PA12 | Twin screw extruder | 39 | 8.43 | 71.4 |
| Inventive Example 6 | PARALOID ™ KM 357P | PA12 | Twin screw extruder | 28 | 5.88 | 74.5 |
| Inventive Example 7 | PARALOID ™ LTL4450 | PA12 | Twin screw extruder | 27 | 7.17 | 81.4 |
| Inventive Example 8 | PARALOID ™ EXL 2314 | PA6 | Twin screw extruder | 34 | 7.02 | 77.3 |
| Inventive Example 9 | PARALOID ™ EXL 2314 | PC | Twin screw extruder | — | — | — |

TABLE 2

| Example Number | Dispersant | Continuous Phase | Compounding equipment | Mixer | Rotor | Mass [g] | Temperature [° C.] | Speed [min⁻¹] | Time [min] |
|---|---|---|---|---|---|---|---|---|---|
| Inventive Example 3 | PARALOID ™ KM 370 | PA12 | Haake | Rheomix3000p | Banbury-Rotors R3000 | 275 | 190 | 40-50 | 5 |
| Inventive Example 4 | PARALOID ™ EXL 2314 | PA12 | Haake | Rheomix3000p | Banbury-Rotors R3000 | 275 | 200 | 40-50 | 5 |

TABLE 3

| Example Number | Dispersant | Continuous Phase | Compounding equipment | Temperature Profile [° C.] | Throughput [kg/h] | Torque [%] | Pressure [bar] | Melt T [° C.] |
|---|---|---|---|---|---|---|---|---|
| Inventive Example 5 | PARALOID ™ EXL 2314 | PA12 | Twin Screw Extruder | Hopper------------------------>Die 200-->205-->205-->205-->210 | 12 | 71 | 39 | 219 |
| Inventive Example 6 | PARALOID ™ KM 357P | PA12 | Twin Screw Extruder | Hopper------------------------>Die 200-->205-->205-->205-->210 | 12 | 68 | 28 | 216 |
| Inventive Example 7 | PARALOID ™ LTL 4450 | PA12 | Twin Screw Extruder | Hopper------------------------>Die 200-->205-->205-->205-->210 | 3 | 35 | 19 | 217 |
| Inventive Example 8 | PARALOID ™ EXL 2314 | PA6 | Twin Screw Extruder | Hopper------------------------>Die 200-->205-->205-->205-->210 | 12 | 83 | 60 | 220 |
| Inventive Example 9 | PARALOID ™ EXL 2314 | PC | Twin Screw Extruder | Hopper------------------------>Die 260-->260-->270-->270-->280 | 10 | 65 | 36 | 295 |

Tensile tests were performed on the Zwick universal testing machine at room temperature and atmospheric pressure using a machine cross-head velocity of 200 mm/min.

For the compression set measurements, 13 mm diameter buttons were cut out of the compression molded plates (examples 1-4) or injection molded plates (examples 5-9), stacked to form 6 mm thick samples and compressed (clamped) to 75% of the original thickness (6 mm original, compressed to 4.5 mm). The compression samples were placed in the oven for 70 h at 125° C. After the 70 hours in the oven, samples were unclamped, left to cool down for 30 min and their thickness was measured. Compression set was calculated as the ratio between the thickness measured after cooling and the original thickness.

We claim:

1. A thermoplastic composition comprising the melt blending product of:
   from 10 to 75 percent by weight of a continuous phase, based on the total weight of the thermoplastic composition, wherein said continuous phase comprises one or more thermoplastic polymers; and
   from 50 to 80 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm;

wherein said crosslinked elastomer core comprises an elastomeric crosslinked component having a glass transition temperature in the range of from less than 0° C.;

wherein said crosslinked elastomer core comprises crosslinked polydimethylsiloxane copolymers; and wherein said crosslinked polydimethylsiloxane copolymers comprise one or more monomers selected from the group consisting of vinylmethyldimethoxysilane, allylmethyldimethoxysilane, mercaptopropylmethyldimethoxysilane, butadiene, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof.

2. A method for producing a thermoplastic composition comprising the steps of:

selecting a continuous phase comprising one or more thermoplastic polymers;

selecting a dispersed phase comprising one or more core/shell polymer particles comprising a crosslinked elastomer core and a thermoplastic shell and wherein said an average particle size diameter in the range of from 70 to 10,000 nm;

melt kneading said one or more core/shell polymer particles into said continuous phase;

thereby producing said thermoplastic composition, wherein said thermoplastic composition comprises from 10 to 75 percent by weight of the continuous phase, and from 50 to 80 percent by weight of the dispersed phase comprising one or more core/shell polymer particles, based on the total weight of the thermoplastic composition wherein said crosslinked elastomer core comprises an elastomeric crosslinked component having a glass transition temperature in the range of from less than 0° C.;

wherein said crosslinked elastomer core comprises crosslinked polydimethylsiloxane copolymers; and wherein said crosslinked polydimethylsiloxane copolymers comprise one or more monomers selected from the group consisting of vinylmethyldimethoxysilane, allylmethyldimethoxysilane, mercaptopropylmethyldimethoxysilane, butadiene, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof.

3. An article comprising:

a thermoplastic composition comprising the melt blending product of:

from 10 to 75 percent by weight of a continuous phase, based on the total weight of the thermoplastic composition, wherein said continuous phase comprises one or more thermoplastic polymers; and from 50 to 80 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 70 to 10,000 nm wherein said crosslinked elastomer core comprises an elastomeric crosslinked component having a glass transition temperature in the range of from less than 0° C.;

wherein said crosslinked elastomer core comprises crosslinked polydimethylsiloxane copolymers; and wherein said crosslinked polydimethylsiloxane copolymers comprise one or more monomers selected from the group consisting of vinylmethyldimethoxysilane, allylmethyldimethoxysilane, mercaptopropylmethyldimethoxysilane, butadiene, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof.

4. A method for forming an article comprising the steps of:
selecting a thermoplastic composition comprising the melt blending product of:

from 10 to 75 percent by weight of a continuous phase, based on the total weight of the thermoplastic composition, wherein said continuous phase comprises one or more thermoplastic polymers; and from 50 to 80 percent by weight of a dispersed phase comprising one or more core/shell polymer particles, based on the total weight of the thermoplastic composition, wherein said one or more core/shell polymer particles comprise a crosslinked elastomer core and a thermoplastic shell and wherein said core/shell polymer has an average particle size diameter in the range of from 50 to 10,000 nm wherein said crosslinked elastomer core comprises an elastomeric crosslinked component having a glass transition temperature in the range of from less than 0° C.;

wherein said crosslinked elastomer core comprises crosslinked polydimethylsiloxane copolymers; and wherein said crosslinked polydimethylsiloxane copolymers comprise one or more monomers selected from the group consisting of vinylmethyldimethoxysilane, allylmethyldimethoxysilane, mercaptopropylmethyldimethoxysilane, butadiene, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, and crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof;

forming said thermoplastic composition into said article.

5. The thermoplastic composition according to claim 1, wherein said one or more thermoplastic polymers are selected from the group consisting of acrylonitrile butadiene styrene polymer (ABS), fluoropolymers, polyamides, polyarylates, thermoplastic polyesters (PET, PBT), thermoplastic polyimides (PI, PAI, PEI), polyoxymethylene (POM), polyacetal, polyphenylene oxide (PPO), polyaryletherketones (PEEK, PEK), polysulphones (PSUL, PES), polyphenylene sulphide (PPS), polyethylene, polypropylene, polyphenylene sulfide, polystyrene, polyvinyl chloride, polycarbonate, polylactic acid, polyether sulfide, and polymethacrylate.

6. The thermoplastic composition according to claim 1, wherein said one or more thermoplastic polymers have a melting point of greater than 85° C. or a glass transition temperature of greater than 85° C.

7. The thermoplastic composition according to claim 1, wherein said one or more thermoplastic polymers have a melting point of greater than 100° C. or a glass transition temperature of greater than 100° C.

8. The thermoplastic composition according to claim 1, wherein said one or more thermoplastic polymers have a melting point of greater than 150° C. or a glass transition temperature of greater than 150° C.

9. The thermoplastic composition according to claim 1, wherein said wherein said shell comprises a thermoplastic component having a glass transition temperature in the range of greater than from 30° C.

10. The thermoplastic composition according to claim 1, wherein said one or more core/shell polymer particles comprise one or more shells comprising polyalkyl(meth)acrylate copolymers and/or crosslinked derivatives thereof.

11. The thermoplastic composition according to claim 1, wherein said thermoplastic polymer shell comprises one or more monomers selected from the group consisting of methylmethacrylate, styrene, butyl acrylate, ethyl acrylate, 2-ethyl hexyl acrylate, propyl acrylate, methyl acrylate, hexyl acrylate, butylmethacrylate, ethylhexyl methacrylate, benzyl acrylate, benzyl methacrylate, and optionally crosslinking monomers selected from the group consisting of divinylbenzene, trimethylolpropane triacrylate, ethylene glycol dimethacrylate, trimethylolpropane trimethacrylate, allyl methacrylate, blends thereof, and combinations thereof.

12. The thermoplastic composition according to claim 1, wherein said shell comprises one or more functional groups.

13. The thermoplastic composition according to claim 12, wherein the functional group is selected from the group consisting of hydroxy group, carboxyl group, epoxy group, glycidol group, anhydride group, amide group, silyl group, allyl group, and combinations of two or more thereof.

14. The thermoplastic composition according to claim 12, wherein the functional group is a hydroxy, carboxyl, epoxy, glycidol, anhydride, amide, silyl, or allyl group.

* * * * *